United States Patent
Ostino et al.

(10) Patent No.: US 11,753,945 B2
(45) Date of Patent: Sep. 12, 2023

(54) TURBINE BLADE COMPRISING RIBS BETWEEN COOLING OUTLETS WITH COOLING HOLES

(71) Applicant: SAFRAN AIRCRAFT ENGINES, Paris (FR)

(72) Inventors: Léandre Ostino, Moissy-Cramayel (FR); Erwan Daniel Botrel, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/906,300

(22) PCT Filed: Mar. 9, 2021

(86) PCT No.: PCT/FR2021/050393
§ 371 (c)(1),
(2) Date: Sep. 14, 2022

(87) PCT Pub. No.: WO2021/186122
PCT Pub. Date: Sep. 23, 2021

(65) Prior Publication Data
US 2023/0098861 A1    Mar. 30, 2023

(30) Foreign Application Priority Data
Mar. 18, 2020   (FR) ........................... 2002647

(51) Int. Cl.
*F01D 5/18*    (2006.01)

(52) U.S. Cl.
CPC ........ *F01D 5/187* (2013.01); *F05D 2240/304* (2013.01); *F05D 2250/231* (2013.01);
(Continued)

(58) Field of Classification Search
CPC .............. F01D 5/187; F05D 2260/202; F05D 2240/304
See application file for complete search history.

(56) References Cited

U.S. PATENT DOCUMENTS 6,174,134 B1 * 1/2001 Lee .................. F01D 5/187
                                                 415/115
9,422,816 B2 * 8/2016 Spangler .............. F01D 5/186
(Continued)

FOREIGN PATENT DOCUMENTS

EP     1035302 A2    9/2000
EP     1213442 A1    6/2002
(Continued)

OTHER PUBLICATIONS

International Search Report for issued in Application No. PCT/FR2021/050393 dated Jun. 22, 2021.
(Continued)

*Primary Examiner* — Eldon T Brockman
(74) *Attorney, Agent, or Firm* — Pearne & Gordon LLP

(57) ABSTRACT

A turbomachine turbine blade, includes a platform, a vane, a cooling cavity supplying a plurality of cooling outlets provided along the trailing edge, two radially adjacent cooling outlets defining therebetween a rib. At least one cooling hole is formed in the thickness of at least one rib and/or in the thickness of a portion of the trailing edge fillet located in the axial extension of at least one rib, so as to ensure fluid communication for a cooling flow between the inside and the outside of the blade for cooling the at least one rib.

10 Claims, 5 Drawing Sheets

(52) U.S. Cl.
CPC .............. *F05D 2260/202* (2013.01); *F05D 2260/22141* (2013.01)

(56) References Cited

U.S. PATENT DOCUMENTS

| | | | |
|---|---|---|---|
| 10,329,924 B2* | 6/2019 | Barker | F01D 5/187 |
| 10,876,413 B2* | 12/2020 | Barker | F01D 5/147 |
| 2003/0133795 A1 | 7/2003 | Manning et al. | |
| 2010/0074762 A1 | 3/2010 | Liang | |
| 2010/0329835 A1* | 12/2010 | Spangler | F01D 5/187 |
| | | | 29/889.721 |
| 2013/0302176 A1* | 11/2013 | Bergholz, Jr | F01D 5/187 |
| | | | 416/97 R |
| 2017/0030199 A1* | 2/2017 | Barker | F01D 5/187 |
| 2019/0292919 A1* | 9/2019 | Barker | F01D 5/189 |

FOREIGN PATENT DOCUMENTS

| | | |
|---|---|---|
| EP | 3041989 B1 | 10/2019 |
| FR | 2864990 A1 | 7/2005 |
| WO | 2013169471 A1 | 11/2013 |

OTHER PUBLICATIONS

Written Opinion for PCT/FR2021/050393 dated Jun. 22, 2021.
Search Report issued in French Patent Application No. 2002647 dated Nov. 19, 2020.

* cited by examiner imagery# TURBINE BLADE COMPRISING RIBS BETWEEN COOLING OUTLETS WITH COOLING HOLES This is the National Stage of PCT international application PCT/FR2021/050393, filed on Mar. 9, 2021 entitled "TURBINE BLADE COMPRISING RIBS BETWEEN COOLING OUTLETS WITH COOLING HOLES", which claims the priority of French Patent Application No. 2002647 filed Mar. 18, 2020, both of which are incorporated herein by reference in their entireties.

TECHNICAL FIELD

The present invention relates to the general field of cooling turbomachine turbine blades, and more particularly to the field of cooling moving turbine blades for turbomachines.

The invention applies to any type of aeronautical or terrestrial turbomachines. It can in particular be applied to the moving turbine blades of aircraft turbomachines such as turbojets and turboprops, for example turbofan engines. It can also be applied to the moving blades of industrial gas turbines. The invention further relates to the cooling of high pressure or low pressure turbine moving blades.

Prior Art

In order to design increasingly efficient engines with reduced consumption, turbine blades have been developed that are increasingly reduced in size and resistant to increasingly high thermal and mechanical stresses such as temperature, pressure, rotational speed, among others.

It is indeed known that the blades of a turbomachine gas turbine, and in particular of the high pressure turbine, are subjected to the high temperatures of the combustion gases during the operation of the engine. These temperatures reach values that are far above those that the various parts that are in contact with these gases can withstand without damage, which has the effect of limiting their service life.

It is also known that a rise in the temperature of the gases of the high pressure turbine allows to improve the efficiency of a turbomachine, and therefore the ratio between the thrust of the engine and the weight of an airplane propelled by this turbomachine. Consequently, efforts have been made to produce turbine blades that can withstand higher and higher temperatures. In addition, the improvement of the turbine blades allows to reduce the fuel consumption of the engine.

One of the solutions that exist today to improve the blades, and in particular to improve the mechanical strength of the blades, is to reduce their operating temperature by making cooling more efficient. This cooling is obtained in particular by means of cooling circuits provided in the blades aiming at reducing the temperature of the latter. Thanks to such circuits, cooling air, which is generally introduced into the blade through its root, crosses the latter following a path formed by cavities made in the blade before being ejected through holes (or drillings) opening at the surface of the blade, and in particular at the trailing edge of the blade. Improving the cooling circuit of a blade allows to reduce the air flow rate necessary for its cooling and also allows to increase the service life of the blades and/or to ensure that a service life objective is met in a context of increased temperature at the inlet of the turbine stage.

Moreover, the improvement of the blades is also made possible by the improvement of the aerodynamic profile in order to increase the efficiency of the blade.

Solutions have already been described in the prior art aiming at improving the cooling and the aerodynamic profile at the trailing edge of a moving blade of a high pressure turbine. By way of example, the French patent application FR 3 041 989 A1 discloses the cooling of the trailing edge of a high pressure turbine blade by means of three distinct cooling regions. French patent application FR 2 864 990 A1 describes solutions for improving cooling air discharge slots at the trailing edge of a high pressure turbine blade.

However, there remains a need to further improve the cooling efficiency at the trailing edge of a turbine blade, in particular to guarantee its mechanical strength and maximise the aerodynamic efficiency. In particular, in the context of the cooling of the trailing edge by means of cooling slots, the ribs between slots are hardly subjected to the influence of the cooling films located upstream and an excessive temperature gradient exists along the ribs.

DESCRIPTION OF THE INVENTION

The purpose of the invention is therefore to at least partially overcome the needs mentioned above and the disadvantages relating to the embodiments of the prior art.

The object of the invention is thus, according to one of its aspects, a turbomachine turbine blade, intended to be mounted around an axis of rotation, including a platform, in particular an inner platform, and a vane extending in a radial direction relative to the axis of rotation, going radially from the inside to the outside away from the platform and ending in a top, the vane comprising a leading edge and a trailing edge, located downstream of the leading edge, and the vane comprising a lower surface wall and an upper surface wall each connecting the leading edge to the trailing edge, the lower surface wall and the upper surface wall being connected to each other at the trailing edge by a trailing edge fillet, the blade including a cooling cavity supplying cooling flow to a plurality of cooling outlets, in particular cooling slots, extending in particular for the most part substantially axially, emerging onto the trailing edge, the cooling outlets being provided along the trailing edge, on one of the lower surface and upper surface walls, between the platform and the top, two adjacent cooling outlets being delimited by a rib, extending in particular mainly axially, between an upstream end, located radially between the two adjacent cooling outlets, in particular substantially aligned radially with the upstream end of an adjacent cooling outlet, and a downstream end, which emerges onto the trailing edge, in particular substantially aligned radially with the downstream end of said adjacent cooling outlet, characterised in that at least one cooling hole is formed in the thickness of at least one rib, between the upstream end and the downstream end, and/or in the thickness of a portion of the trailing edge fillet in the axial extension, in particular substantially axially aligned, of at least one rib, downstream of the downstream end, so as to ensure fluid communication for a cooling flow between the inside and the outside of the blade for cooling said at least one rib.

Thanks to the invention, it is possible to reduce the fuel consumption of the turbine engine by reducing the flow rate necessary for cooling the blades, in particular the moving blades of a high pressure turbine, with the same service life as a turbine blade integrating a conventional cooling circuit. In addition, it is possible to increase the service life of the blades, in particular high pressure turbine blades, compared to blades integrating a conventional solution for cooling the trailing edge, for example slots at the trailing edge.

The turbine blade according to the invention may further include one or more of the following features taken individually or in any possible technical combination.

Said at least one cooling hole may include a cooling hole, in particular a drilling, preferably having a circular and/or oblong cross-sectional shape formed in the thickness of a portion of the trailing edge fillet located in the axial extension, in particular substantially axially aligned, of at least one rib, downstream of the downstream end, the axis of said cooling hole being in particular arranged in the extension of a median axis of said at least one rib, in particular still substantially aligned with a median axis of said at least one rib, the median axis extending along the rib.

In particular, said cooling hole may have a cylindrical portion which has a radial cross-sectional dimension, in particular a diameter, preferably substantially constant through the wall of the portion of the trailing edge fillet from the inside of the blade to the outside of the blade, in particular comprised between 0.10 mm and 0.50 mm.

Said cooling hole may include a groove which emerges onto the trailing edge and which flares out in the extension of the cylindrical portion of the cooling hole.

In particular, said cooling hole may have a cylindrical portion which has a radial cross-sectional dimension, in particular a diameter, which is preferably substantially constant, in particular comprised between 0.10 mm and 0.50 mm, through the wall of the portion of the trailing edge fillet from the inside of the blade to the inlet of a groove formed inside the wall of the portion of the trailing edge fillet and emerging at its outlet onto the outside of the blade. Said groove may have a non-zero axial dimension and a radial dimension greater than the radial dimension of said cooling hole upstream of the groove, in particular a variable radial dimension.

Moreover, the ratio between the radial dimension of said cooling hole upstream of the groove and the diameter of the trailing edge fillet may be strictly comprised within the range 0.25 and 0.85.

Furthermore, said at least one cooling hole may include a cooling hole formed in the thickness of at least one rib, between the upstream end and the downstream end, in particular a drilling, in particular of cylindrical shape and/or with a first portion of cylindrical shape and a second portion of flared shape comprising divergent walls.

Said cooling hole may be cylindrical in shape with a ratio of the cross-sectional diameter to the radial dimension of the rib strictly comprised between 0.20 and 0.85. In addition, the ratio of the axial distance of said cooling hole relative to the downstream end of the rib to the axial distance of the rib between its upstream and downstream ends may be strictly comprised between 0.1 and 0.9.

Moreover, at least one cooling hole can be formed in the thickness of each rib, between the upstream end and the downstream end, and at least one other cooling hole can be formed in the thickness of a portion of the trailing edge fillet located in the axial extension, in particular substantially axially aligned, of each rib, downstream of the downstream end, so as to ensure fluid communication for a cooling flow between the inside and the outside of the blade for cooling each rib.

In addition, said at least one cooling hole may include a plurality of cooling holes, each being formed in the thickness of a rib, between the upstream end and the downstream end, and/or in the thickness of a portion of the trailing edge fillet located in the axial extension, in particular substantially axially aligned, of a rib, and the radial pitch of the cooling holes, corresponding to the radial dimension between two adjacent holes and measured from the centre of the outlet section of a hole to the centre of the outlet section of the adjacent hole, can be comprised between two and four times the radial dimension of a cooling hole, in particular its diameter.

Moreover, the radial pitch of the ribs, corresponding to the radial dimension between two radially adjacent ribs and measured from the centre of a rib to the centre of the adjacent rib, can be comprised between two and eight times the radial dimension of a rib, that is to say the width of a rib.

Said at least one cooling hole may further include a plurality of cooling holes, each being formed in the thickness of a rib, between the upstream end and the downstream end, and/or in the thickness of a portion of the trailing edge fillet located in the axial extension, in particular substantially axially aligned, of a rib, and the radial height of the area comprising the cooling holes may be comprised between 10 and 40% of the radial height of the vane, corresponding to the radial dimension of the vane between the platform and the top. The area comprising the cooling holes can be continuous or discontinuous. In the latter case, the radial height of this area may correspond to the sum of the radial heights of at least two local portions comprising cooling holes.

Preferably, the blade may be a moving blade for a moving turbine wheel for a turbomachine, in particular a high pressure turbine.

Moreover, another object of the invention, according to another of its aspects, is a turbine for a turbomachine, characterised in that it includes at least one moving wheel comprising a plurality of moving blades such as that defined previously, the turbine preferably being a high pressure turbine.

In addition, the object of the invention is also, according to another of its aspects, a turbine for a turbomachine, characterised in that it includes at least one distributor comprising a plurality of stationary blades such as that defined previously, the turbine being preferably a high pressure turbine.

Furthermore, the object of the invention is additionally, according to another of its aspects, a turbomachine, characterised in that it includes at least one turbine as defined previously, the turbomachine preferably being a twin-spool turbomachine.

The blade, the turbine and the turbomachine according to the invention may include any one of the features stated in the description, taken in alone or according to any technically possible combination with other features.

BRIEF DESCRIPTION OF THE DRAWINGS

The invention can be better understood upon reading the detailed description which follows, of non-limiting examples of implementation thereof, as well as upon examining the schematic and partial figures, of the appended drawing, on which.

In all these figures, identical references may designate identical or similar elements.

In addition, the various portions shown in the figures are not necessarily shown on a uniform scale, to make the figures more readable.

Detailed Description of Particular Embodiments

Figure 1:
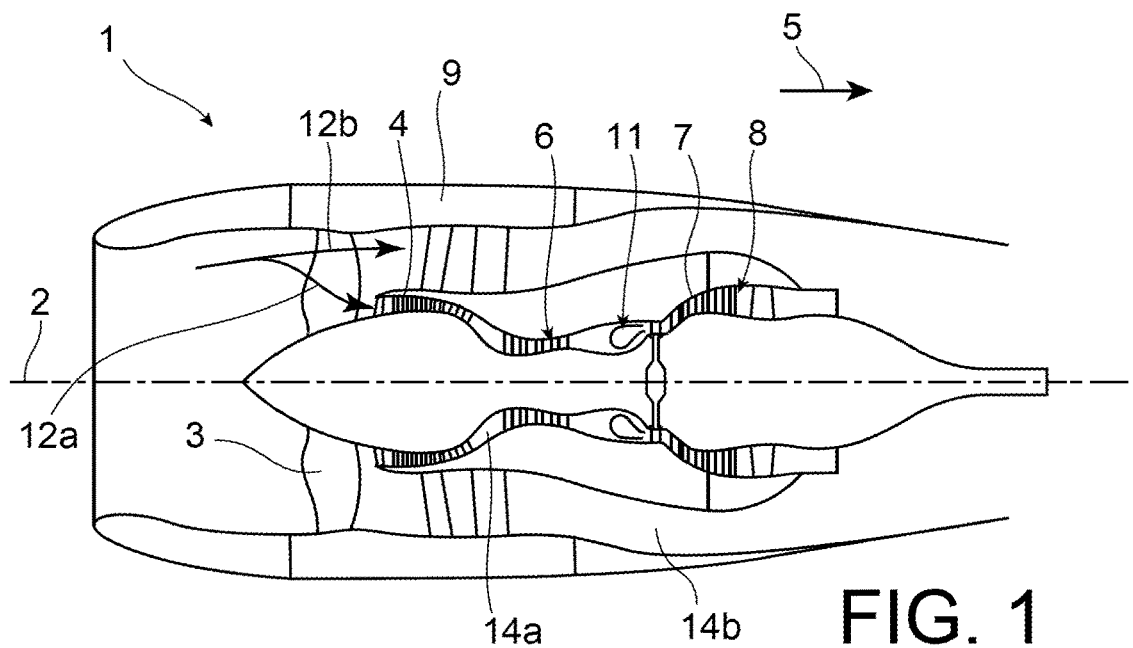
FIG. 1 is a schematic view in axial section of an example of a turbofan engine suitable for implementing the invention.

Throughout the description, it is noted that the axis 2 of the turbomachine 1 is referred to as the axis of radial symmetry of the latter (see FIG. 1). The axial direction of the turbomachine 1 corresponds to the axis of rotation 2 of the turbomachine 1. A radial direction of the turbomachine 1 is a direction perpendicular to the axis 2 of the turbomachine 1. Furthermore, unless otherwise specified, the adjectives and adverbs axial, radial, axially and radially are used with reference to the aforementioned axial and radial directions, and the terms inner (or internal) and outer (or external) are used with reference to a radial direction so that the inner portion of one element is closer to the axis 2 of the turbomachine 1 than the outer portion of the same element. In addition, it is noted that the terms upstream and downstream are to be considered relative to a main direction 5 of normal gas flow (from upstream to downstream) for the turbomachine 1.

FIG. 1 shows an aircraft turbomachine 1, for example here a turbofan and twin-spool turbojet engine, which has a central longitudinal axis 2 around which its various components extend. It comprises, from upstream to downstream along a main direction 5 of gas flow through this turbomachine, a fan 3, a low pressure compressor 4, a high pressure compressor 6, a combustion chamber 11, a high pressure turbine 7 and a low pressure turbine 8.

Conventionally, after passing through the fan, the air splits into a central primary flow 12a and a secondary flow 12b which surrounds the primary flow. The primary flow 12a flows in a main gas flow path 14a passing through the compressors 4, 6, the combustion chamber 11 and the turbines 7, 8. The secondary flow 12b, in turn, flows in a secondary flow path 14b delimited radially outwards by an engine casing, surrounded by a nacelle 9.

Conventionally, the high pressure turbine 7 has alternating moving wheels and distributors. A distributor includes a plurality of fixed blades, and a moving wheel includes a plurality of moving blades 18, as shown in FIG. 2.

The moving blades 18 of the high pressure turbine 7 can mainly be cooled, at the trailing edge, through drillings made in the thickness of the trailing edge fillet or else through cooling slots.

Both of these cooling technologies have advantages and disadvantages. Thus, the drillings made in the thickness of the trailing edge fillet have a good compromise from a thermomechanical point of view. They ensure a controlled thermal level at the trailing edge. However, this requires defining a trailing edge of the aerodynamic profile that is relatively thick given the minimum thicknesses of material in this area, which then has an unfavourable effect on the aerodynamic efficiency of the aerodynamic profile. Furthermore, the slots at the trailing edge allow to define a relatively fine aerodynamic dihedral. From a thermal point of view, however, they are less efficient than drillings emerging into the thickness of the trailing edge fillet. Indeed, the air emitted at the inlet of the trailing edge slots to cool the slot bottom by film heats up in contact with the air of the main flow path when traversing the slot bottom.

Figure 2:
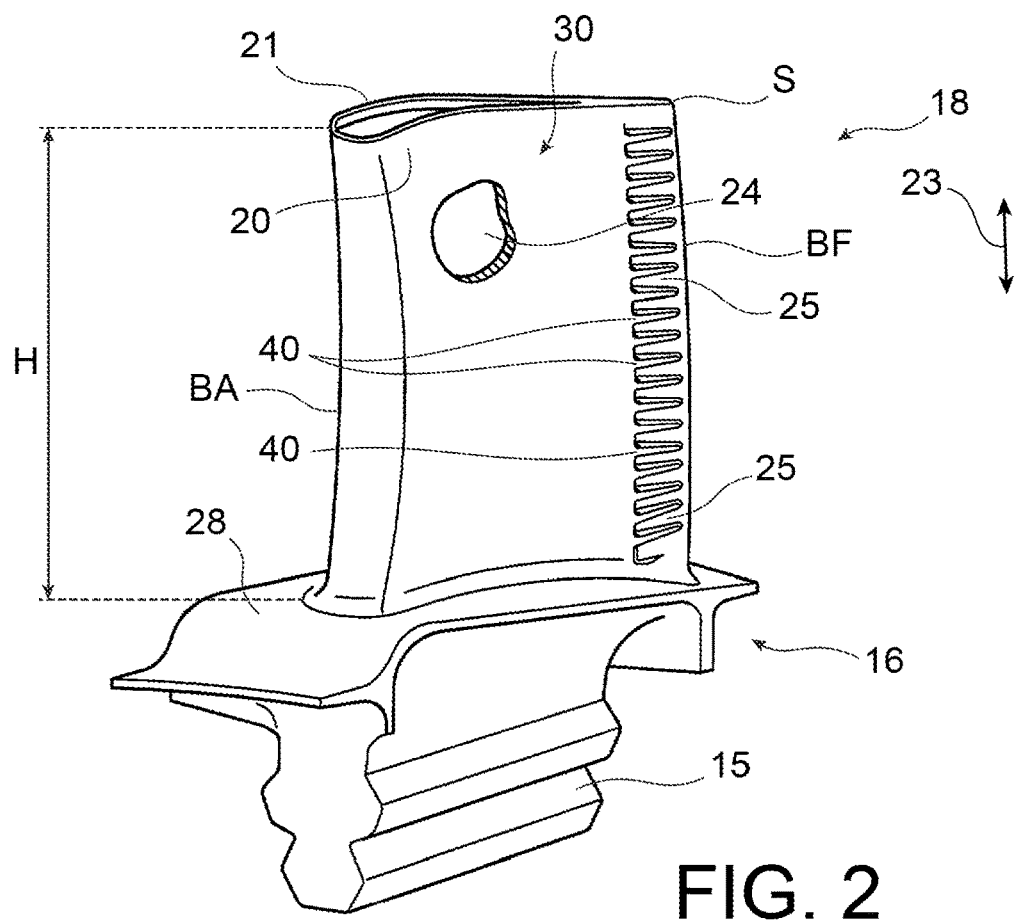
FIG. 2 shows, in a perspective view, an example of a moving turbine blade of a turbojet engine such as that of FIG. 1, FIGS. 3A and 3B show, according to partial enlarged side views, two embodiments of turbine blades in accordance with the invention.

By way of example, FIG. 2 shows in perspective a moving blade 18 of a turbine, for example of a high pressure turbine 7 as previously described with reference to FIG. 1. The blade 18 is fixed to a turbine rotor (not shown) by means of a fitting 15 generally in the shape of a fir tree.

The blade 18 is in the shape of an aerodynamic surface formed by a vane 30 which extends radially, in the radial direction 23, between a blade root 16 and a blade top S and axially between a leading edge BA and a trailing edge BF. The aerodynamic surface of the blade 18 thus defines a lower surface wall 20 and an upper surface wall 21.

The fitting 15 of the blade 18 is connected to the blade root 16 at an inner platform 28 defining a wall for the flow path of the combustion gases through the turbine.

The blade 18 which is subjected to the high temperatures of the combustion gases passing through the turbine needs to be cooled. To this end, and in a manner known per se, the blade 18 includes one or more internal cooling circuits. Each cooling circuit consists of at least one cavity 24 extending radially between the root 16 and the top S of the blade. The cavity is supplied with cooling air at one of its radial ends through an air intake opening (not shown). This air intake opening is generally provided at the fitting 15 of the blade 18. In order to discharge the cooling air flowing in the cavity 24 of the cooling circuits, a plurality of slots 25 are distributed along the trailing edge BF, between the root 16 and the top S of the blade. These discharge slots 25 open into the cavity 24 and emerge at the lower surface wall 20 of the blade 18, at its trailing edge BF.

In order to improve the cooling at the trailing edge and to obtain an improved aerodynamic profile of the moving blade 18, the invention proposes to define a scalable configuration for the ejection of the cooling air at the trailing edge associated with a dihedral at the trailing edge of the aerodynamic profile also scalable according to the radial height, according to local thermomechanical needs and to maximise the aerodynamic efficiency.

In particular, in the context of the cooling of the trailing edge BF by means of cooling slots 25, the ribs 40 between slots are hardly subjected to the influence of the cooling films located upstream and a significant temperature gradient exists along the ribs 40.

Figure 3A:
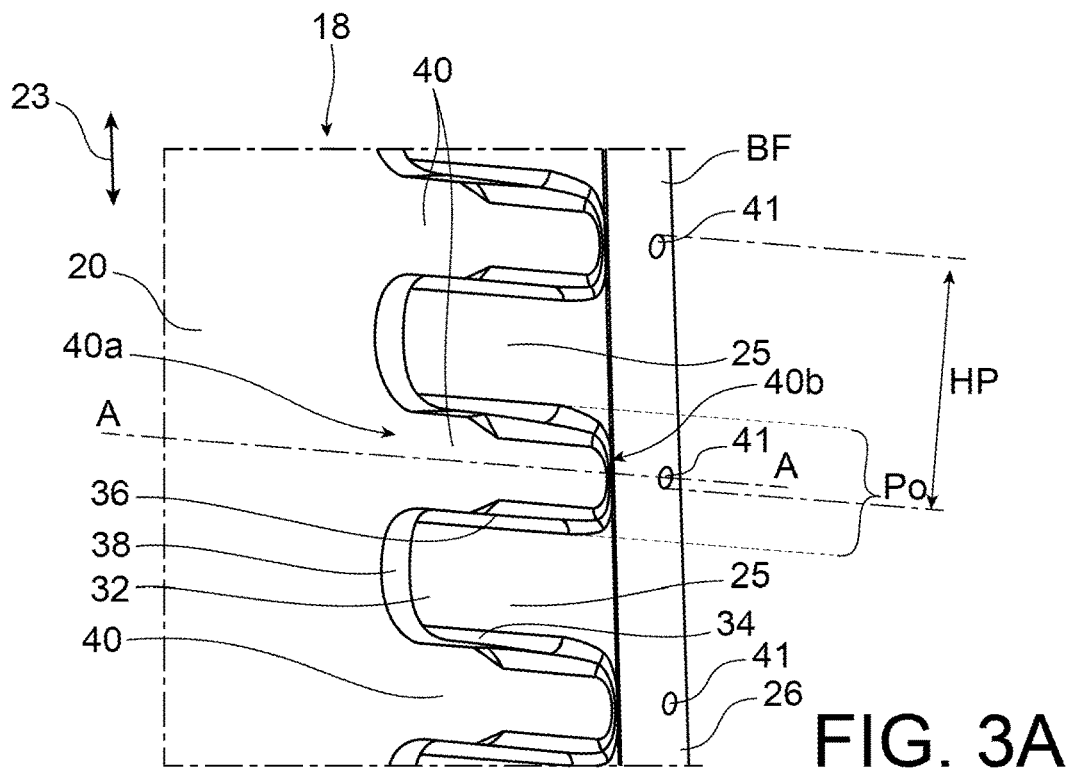

FIG. 3A thus shows, according to a partial enlarged perspective view of a blade 18 such as that shown in FIG. 2, a first exemplary embodiment in accordance with the invention. It should be noted that the features described in connection with the example of FIG. 3A and also applicable to the embodiments of FIGS. 3B to 6B are not necessarily described again for these FIGS. 3B to 6B.

The geometry of the cooling slots 25 is more precisely shown in FIG. 3A. Each cooling slot 25 includes a recessed (or depressed) wall 32, a radially internal flange (or step) 34, a radially external flange (or step) 36 and a side wall 38 provided with an opening (not shown) opening into the cavity 24 of the cooling circuit.

Radially internal flange means the flange which is disposed on the side of the blade root 16. Similarly, radially external flange means the flange which is disposed on the side of the blade top S. The concepts "radially internal" and "radially external" are understood relative to the radial direction in which the blade extends. The recessed wall 32 extends radially between the radially internal flange 34 and the radially external flange 36 and axially between the side wall 38 and the trailing edge BF of the blade. Furthermore, the radially internal 34 and radially external 36 flanges extend between the recessed wall 32 and the aerodynamic surface of the vane 30.

This particular geometry of the cooling slots 25 thus ensures a guiding of the air coming from the cavity 24 of the cooling circuit and allows to cool the trailing edge BF of the blade which is the thinnest portion of the blade and therefore the most exposed to the high temperatures of the combustion gases.

The cooling slots 25 extend substantially axially on the lower surface wall 20 and emerge onto the trailing edge BF. Between two radially adjacent slots 25 is located a rib 40 extending substantially axially between an upstream end 40a, substantially aligned radially with the upstream end of a radially adjacent cooling slot 25, and a downstream end 40b, substantially aligned radially with the downstream end of this radially adjacent cooling slot 25. The blade 18 thus includes a plurality of ribs 40 between the cooling slots 25. In accordance with the invention, at least one cooling hole 41, 42, 43, 44 is formed in the thickness of at least one rib 40, between the upstream end 40a and the downstream end 40b, and/or in the thickness of a portion Po of the trailing edge fillet 26 substantially axially aligned with at least one rib 40, downstream of the downstream end 40b, so as to ensure fluid communication for a cooling flow between the inside and the outside of the blade 18 for cooling said at least one rib 40.

Specifically, in the embodiment of FIG. 3A, cooling holes 41 are formed in the thickness of the portions Po of the trailing edge fillet 26 each substantially axially aligned with the ribs 40.

These cooling holes 41 take the shape of drillings, here of circular cross-sectional shape but which can also be oblong, made in the thickness of the trailing edge fillet 26, between two radially adjacent slots 25 to ensure consequent cooling of areas subject to high thermal loads. The configuration of the holes 41 can depend on the thermal situation of the vane 30 and can be associated with a local thickening of the trailing edge BF of the aerodynamic profile to make the drillings.

In comparison with a blade cooled only by slots 25, the solution of the invention with the presence of holes 41 allows to cool more effectively by pumping effect the ribs 40 at the trailing edge BF. A local increase in the value of the radius of the trailing edge fillet 26 can be achieved, for example from 20 to 100% compared to the profile of a blade cooled only by cooling slots at the trailing edge, depending the radial dimension, in particular the diameter, retained for the drillings 41.

As visible in FIG. 3A, the holes 41 have a drilling axis substantially aligned with the median axis AA of the ribs 40. However, this drilling axis can be offset as needed to respond in particular to manufacturing requirements.

In addition, the holes 41 can be located over all or part of the radial height H of the blade 18 or only at the ribs 40 requiring additional cooling. In particular, depending on the local thermomechanical need, the radial height HP of the area comprising the cooling holes 41 is comprised between 10 and 40% of the radial height H of the vane 30, corresponding to the radial dimension of the vane 30 between the inner platform 28 and the top S, visible in FIG. 2. It should be noted that the presence of such holes 41 over a large percentage of the radial height H, for example between 30 and 40%, is favourable for the thermomechanical resistance, therefore the service life of the blade 18, but unfavourable for its aerodynamic performance.

In the example of FIG. 3A, the cooling holes 41 have a constant diameter d through the wall of the portions Po of the trailing edge fillet 26 from the inside of the blade 18 to the outside of the blade 18, in particular comprised between 0.10 mm and 0.50 mm.

Figure 3B:
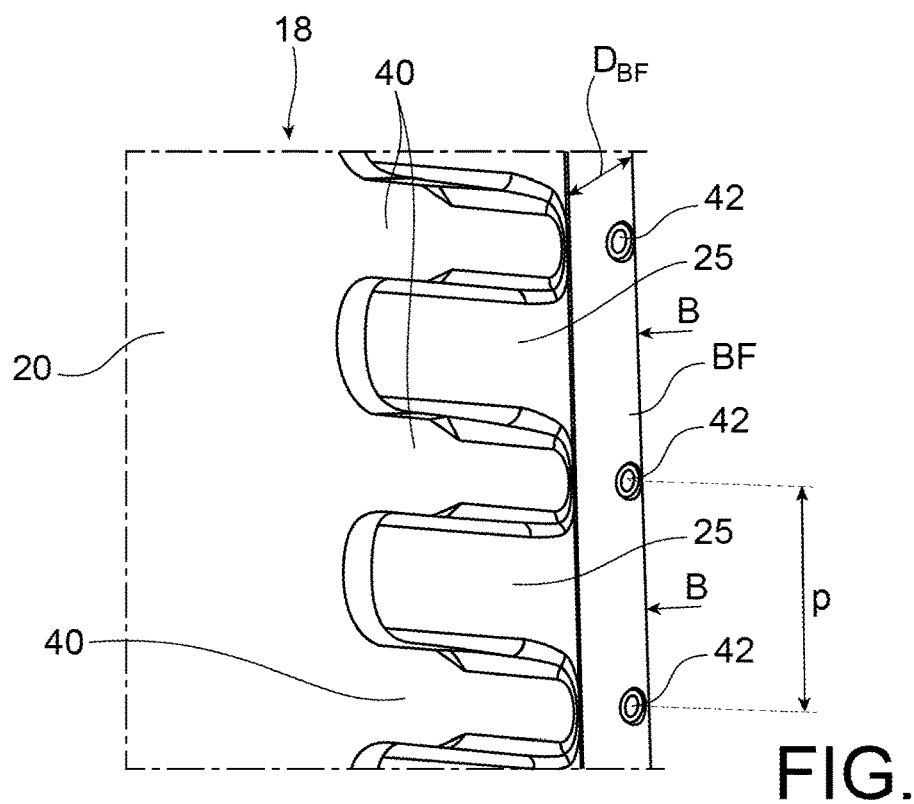
Figure 4:
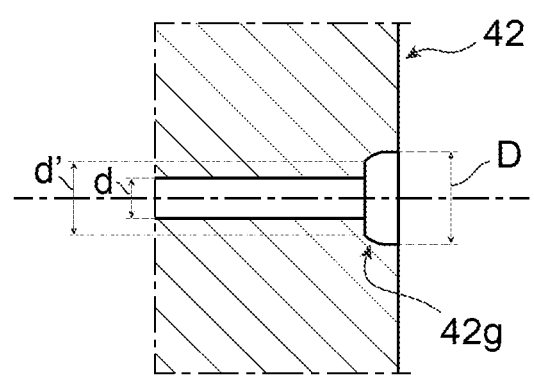
FIG. 4 illustrates, schematically in a sectional view along B-B of FIG. 3B, the geometric configuration of a cooling hole of the turbine of FIG. 3B and FIGS. 5A, 5B, 6A and 6B show, in partial enlarged side views, other embodiments of turbine blades in accordance with the invention.

In the example of FIG. 3B, the cooling holes 42 have a constant diameter d, in particular comprised between 0.10 mm and 0.50 mm, through the wall of the portions Po of the trailing edge fillet 26 from inside the blade 18 to the inlet of the groove 42g. These grooves 42g are visible in FIG. 3B in perspective and in FIG. 4 in section, according to B-B of FIG. 3B. Each groove 42g is formed inside the wall of each portion Po of the trailing edge fillet 26 and emerges at its outlet on the outside of the blade 18. Each groove 42g has a non-zero axial dimension and a radial dimension d' at the bottom of the groove greater than the diameter d of each hole 42 upstream of the groove 42g, and a radial dimension D at the outlet of the groove greater than the radial dimension d' at the bottom of the groove. More specifically, in view of FIG. 4, the following relationship is verified: $d<d'<D$. Furthermore, the radial dimension D at the outlet of the groove, called the diameter of the groove 42g, is strictly comprised between the diameter d upstream of the groove 42g and the diameter of the trailing edge fillet $D_{BF}$, visible in FIG. 3B, that is to say $d<D<D_{BF}$.

Preferably, the ratio between the diameter d of each cooling hole 42 upstream of the groove 42g and the diameter $D_{BF}$ of the trailing edge fillet 26 is strictly comprised within the range 0.25 and 0.85. In other words, $0.25 \cdot D_{BF} < d < 0.85 \cdot D_{BF}$.

Moreover, as can be seen in FIG. 3B, the radial pitch p of the cooling holes 41, 42, corresponding to the radial dimension between two radially adjacent holes and measured from the centre of the outlet section of a hole to the centre of the outlet section of the radially adjacent hole, is comprised between two and four times the diameter d of the holes 41, 42. Moreover, the radial pitch of the ribs 40, corresponding to the radial dimension between two radially adjacent ribs 40 and measured from the centre of a rib in the centre of the adjacent rib, can be comprised between two and eight times the width e of a rib 40.

Figure 5A:
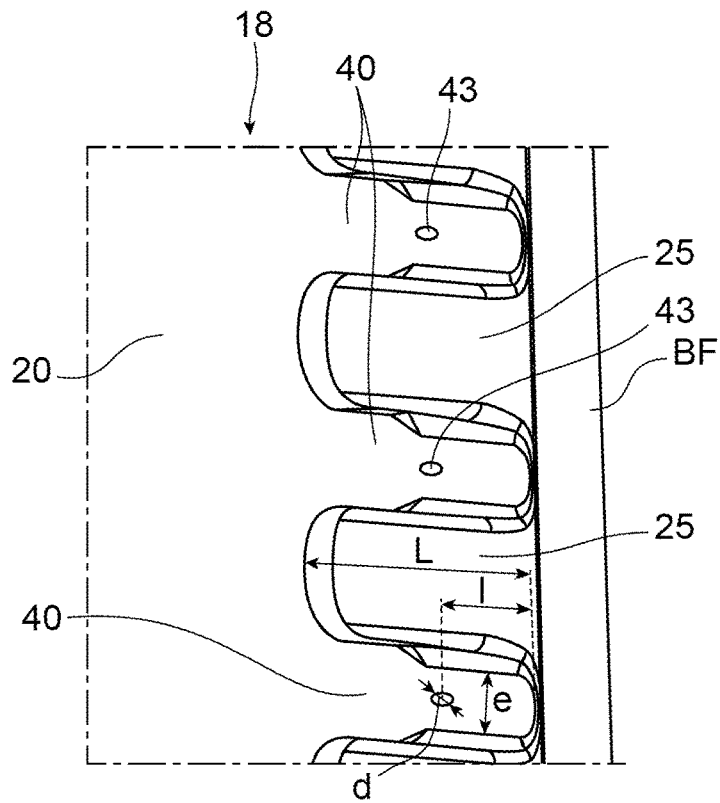

FIG. 5A shows another embodiment in accordance with the invention wherein the cooling holes 43 are formed in the thickness of the ribs 40, between the upstream end 40a and the downstream end 40b.

Figure 5B:
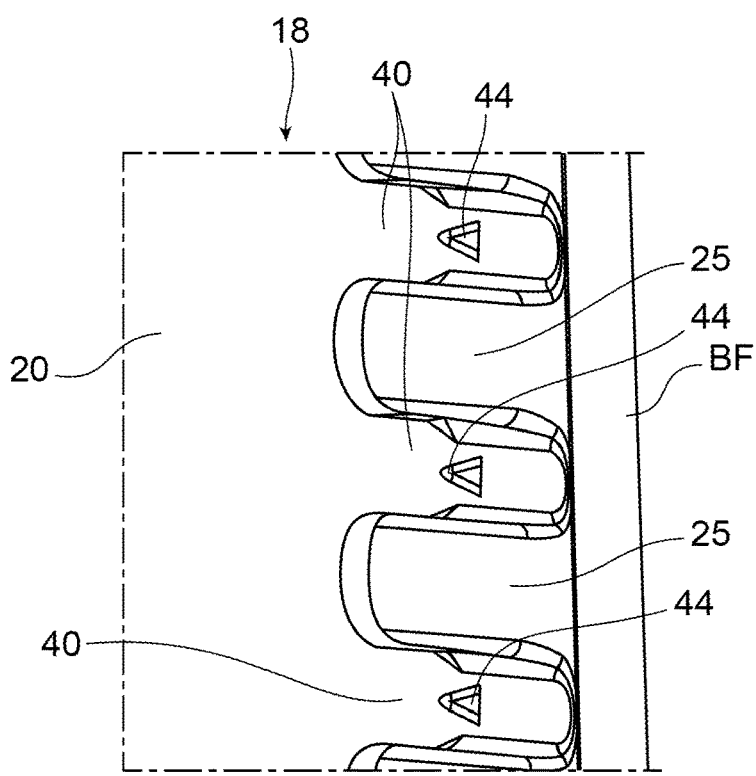

These holes 43 can be formed by drilling and be of cylindrical shape, as in FIG. 5A, or even have a shape with a first portion of cylindrical shape and a second portion of flared shape comprising divergent walls ("laidback fan-shaped hole" type cooling holes), as in the example of FIG. 5B with the cooling holes 44.

In the case of FIGS. 5A and 5B, the preferred cooling mode for cooling the ribs 40 is then film cooling, while in the case of FIGS. 3A and 3B, it is pumping cooling which is preferred for cooling the ribs 40.

In the example of FIG. 5A, each cooling hole 43 is cylindrical in shape with a ratio of the cross-sectional diameter d to the radial dimension e of the rib 40, that is to say the width of the rib 40, strictly comprised between 0.20 and 0.85. In other words, the following relationship holds: $0.20 \cdot e < d < 0.85 \cdot e$.

In addition, the positioning of the holes 43 relative to the downstream end 40b of each rib 40 depends on the aerothermics and the manufacturing capacities. In particular, the ratio of the axial distance I of each cooling hole 43 relative to the downstream end 40b of the rib 40 (that is to say the distance of the drilling relative to the end of the rib) to the axial distance L of the rib 40 between its upstream 40a and downstream 40b ends (that is to say the length of the rib) is strictly comprised between 0.1 and 0.9. In other words, the following relationship holds: 0.1·L<l<0.9·L.

Moreover, it is possible to combine the examples described previously with reference to FIGS. 3A, 3B, 5A and 5B.

Figure 6A:
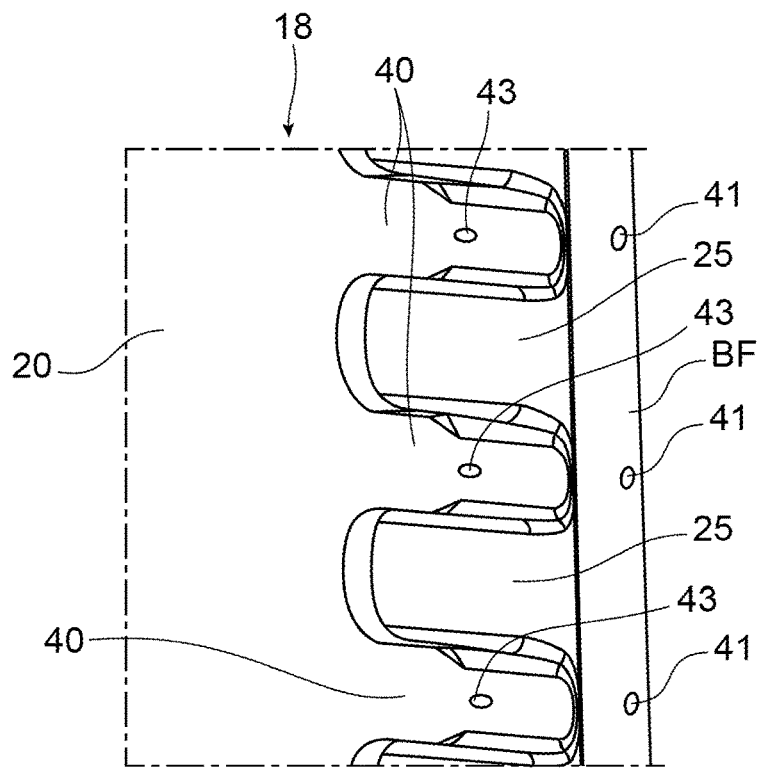
Figure 6B:
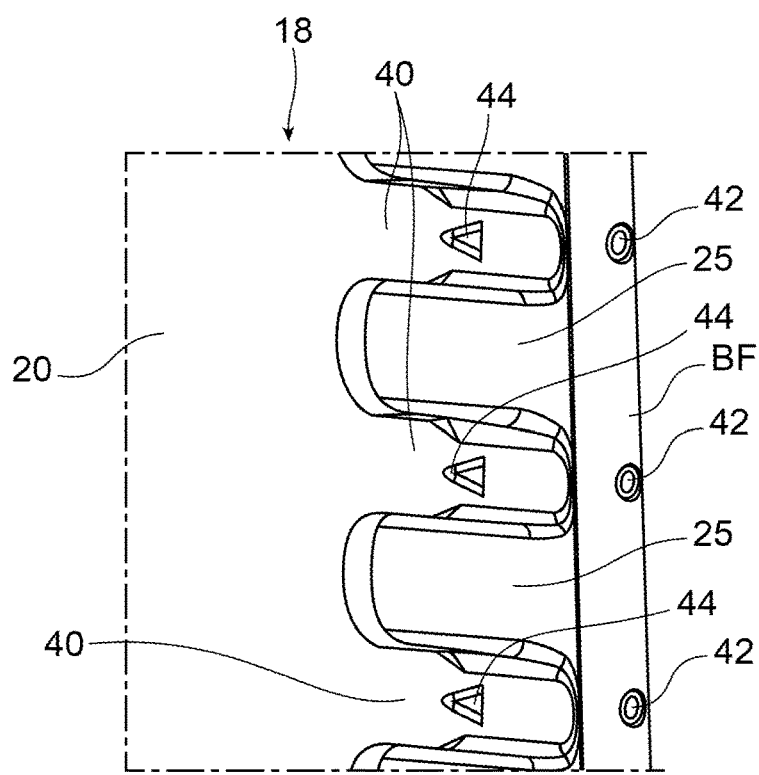

For example, the example of FIG. 6A combines the embodiments of FIGS. 3A and 4A, and the example of FIG. 6B combines the embodiments of FIGS. 3B and 5B. Thus, in FIGS. 6A and 6B, embodiments which combine both pumping cooling and film cooling are obtained. Of course, depending on any design constraints, all other combinations are possible. In particular, the position of the holes 43, 44 in the examples of FIGS. 5A and 5B can be variable between the upstream 40a and downstream 40b ends. It can for example be centred between these ends 40a and 40b, or else be located close to the downstream end 40b, that is to say close to the outlet of the slots 25.

Of course, the invention is not limited to the embodiments which have just been described. Various modifications can be made thereto by the person skilled in the art.

What is claimed is:

1. A turbomachine turbine blade, intended to be mounted around an axis of rotation, including a platform and a vane extending in a radial direction relative to the axis of rotation, going radially from the inside to the outside away from the platform and ending in a top, the vane comprising a leading edge and a trailing edge, the trailing edge being located downstream of the leading edge, and the vane comprising a lower surface wall and an upper surface wall each connecting the leading edge to the trailing edge, the lower surface wall and the upper surface wall being connected to each other at the trailing edge by a trailing edge fillet, the blade including a cooling cavity supplying cooling flow to a plurality of cooling outlets emerging onto the trailing edge, the cooling outlets being provided along the trailing edge, on one of the lower surface and upper surface walls, between the platform and the top, two radially adjacent cooling outlets being delimited by a rib extending between an upstream end, located radially between the two radially adjacent cooling outlets, and a downstream end, which emerges onto the trailing edge, wherein at least one cooling hole is formed in the thickness of at least one rib, between the upstream end and the downstream end, and/or in that at least one cooling hole, having a cylindrical portion, is formed in the thickness of a portion of the trailing edge fillet in the axial extension of at least one rib, downstream of the downstream end, so as to ensure fluid communication for a cooling flow between the inside and the outside of the blade for cooling said at least one rib.

2. The blade according to claim 1, wherein said at least one cooling hole formed in the thickness of a portion of the trailing edge fillet (26) includes a drilling, the axis of said cooling hole being arranged in the extension of a median axis of said at least one rib, the median axis extending along the rib.

3. The blade according to claim 1, wherein the cylindrical portion of said at least one cooling hole formed in the thickness of a portion of the trailing edge fillet has a diameter comprised between 0.10 mm and 0.50 mm.

4. The blade according to claim 3, wherein said at least one cooling hole includes a groove which emerges onto the trailing edge and which flares out in the extension of the cylindrical portion of said at least one cooling hole.

5. The blade according to claim 4, wherein the ratio between the radial dimension of said at least one cooling hole upstream of the groove and the diameter of the trailing edge fillet is strictly comprised within the range 0.25 and 0.85.

6. The blade according to claim 1, wherein said at least one cooling hole formed in the thickness of at least one rib includes a drilling, having a cylindrical shape and/or with a first portion of cylindrical shape and a second portion of flared shape comprising divergent walls.

7. The blade according to claim 6, wherein said cooling hole is cylindrical in shape with a ratio of the cross-sectional diameter to the radial dimension of the rib strictly comprised between 0.20 and 0.85, and/or wherein the ratio of the axial distance of said at least one cooling hole relative to the downstream end of the rib to the axial distance of the rib between its upstream and downstream ends is strictly comprised between 0.1 and 0.9.

8. The blade according to claim 1, wherein it is a moving blade for a moving turbine wheel for a turbomachine.

9. A turbine for a turbomachine, including at least one moving wheel comprising a plurality of moving blades according to claim 1, the turbine being a high pressure turbine.

10. A turbomachine, including at least one turbine according to claim 9, the turbomachine being a twin-spool turbomachine.

* * * * *